United States Patent [19]
Kelly et al.

[11] 3,710,474
[45] Jan. 16, 1973

[54] VANADIUM-MODIFIED TANTALUM FOIL

[75] Inventors: Marvin F. Kelly, Grayslake, Ill.; John B. Lambert, Towson, Md.

[73] Assignee: Fansteel Inc.

[22] Filed: May 22, 1970

[21] Appl. No.: 39,905

[52] U.S. Cl. .................29/183, 75/174, 317/258
[51] Int. Cl. .........................H01g 1/01, C22c 27/00
[58] Field of Search............75/0.5 AB, 0.5 BB, 174; 317/242, 258; 148/4, 32; 29/183

[56] References Cited

UNITED STATES PATENTS 3,320,500  5/1967  Axelrod et al.......................317/258
3,285,716  11/1966  Contant..............................75/174 X
3,203,793  8/1965  Hand...................................75/174
3,357,867  12/1967  Villani.................................148/4

Primary Examiner—Charles N. Lovell
Attorney—Dressler, Goldsmith, Clement & Gordon

[57] ABSTRACT

Controlled amounts of vanadium are added to tantalum prior to fabrication into foil for use in capacitors to provide more uniform capacitance values with variations in temperature.

3 Claims, No Drawings

VANADIUM-MODIFIED TANTALUM FOIL

BRIEF SUMMARY OF THE INVENTION

Electrolytic capacitors for some time have been manufactured from etched tantalum foil. One problem with such capacitors, however, has been an excessive increase in capacitance with increasing temperature. This difference is generally expressed as the capacitance ratio, the ratio between the capacitance at 125° C. and the capacitance at 25° C.; and it is desired to have this ratio at a value as close to 1.0 as possible.

U.S. Pat. No. 3,285,716, issued Nov. 15, 1966, discloses that the capacitance ratio for tantalum foil capacitors may be substantially reduced by the addition of extraneous molybdenum to the tantalum. Other metals, such as iron and nickel, have been tried as additives to tantalum to improve its capacitance ratio without significant success.

It has now been found that vanadium, added to tantalum in amounts above about 30 parts per million, provides substantially improved capacitance ratios. In the preferred proportions from about 60 to about 150 parts per million, vanadium provides capacitance values at 125° C. which are usually no more than about 10 percent higher than the capitance values at 25° C.

The tantalum metal to which vanadium is added in accordance with this invention may be obtained from any source conventionally used to provide metallic tantalum of foil grade. It may, for example, be extracted from ore as $K_2TaF_7$ by liquid-liquid extraction and then converted to tantalum by electrolytic reduction or sodium reduction. Or it may be reclaimed from scrap tantalum by hydriding, milling and screening. High purity is not required, and good results have been obtained with tantalum containing up to about 800 parts per million of extraneous components, including the vanadium.

The vanadium may be added to the tantalum powder as metallic vanadium powder, or as vanadium oxide which is reduced to vanadium in the course of processing to make the foil. Usually, however, the vanadium is added by blending a tantalum powder base material with a vanadium-containing master alloy of tantalum powder to obtain the desired proportion of vanadium. Vanadium is more volatile than tantalum so that some vanadium will be lost in processing, resulting in a lower vanadium content in the foil than in the starting powder. Compensation for such loss is provided by adding more vanadium to the tantalum powder than the desired level in the foil, the amount of the excess being determined by experience at the particular processing conditions utilized.

After addition of the desired amount of vanadium to the tantalum powder, the foil is manufactured by conventional powder metallurgy or melting processes followed by rolling to final product. After rolling to final size, the foil is electrolytically etched in a conventional manner in the presence of an etching solution such as an ammonium bromide solution in methanol containing a small amount of water. Following etching, the foil is anodized to the desired voltage in an electrolytic forming bath such as 0.1% $H_3PO_4$ and water at 90° C.

The improvement in capacitance ratio achieved by this invention is obtained with a surprisingly small amount of added vanadium and is achieved without a significant drop in the capacitance level at 25° C.

DETAILED DESCRIPTION OF THE INVENTION

Examples 1 to 5

A tantalum powder was prepared from bulk tantalum by hydriding to embrittle it, milling and screening the hydrided product and then dehydriding it. A portion of the above tantalum powder was blended with elemental vanadium to make a master alloy powder containing about 2,000 parts per million of vanadium. The powder was milled, screened and acid washed and then hydrostatically pressed and vacuum resistance sintered. The product was then hydrided, milled, screened and dehydrided.

A tantalum powder base material was prepared by extracting tantalum from ore as $K_2TaF_7$ by liquid-liquid extraction followed by electrolytic reduction of the $K_2TaF_7$.

One portion of the base material powder was left unblended as a control. Other portions of the base material powder were then blended with the vanadium-containing master alloy powder in proportions to provide nominal vanadium contents of 50, 125, 250 and 500 parts per million of vanadium, respectively, and all samples, including the control, were then processed to foil using conventional powder metallurgy techniques.

To test the capacitance values and capacitance ratios, foil samples were degreased in cold trichloroethylene, boiled in detergent, washed in deionized water until all detergent was removed and then etched. The etching was carried out for 20 minutes at a current density of 120 milliamps/in.$^2$ in a solution made of 30 grams of ammonium bromide dissolved in one liter of absolute methanol and 10 ml. of water at a controlled temperature of 20° C.

The foil samples were then cut to desired size and anodized for 30 minutes at 75 volts in 0.1 % $H_3PO_4$ at 90° C. and a current density of 35 milliamps/in.$^2$. After rinsing in deionized water, the capacitance of the samples was checked at 25°C. and 125° C. in 12 wt. percent ammonium pentaborate in ethylene glycol using a ½ volt alternating current signal with no direct current bias on the bridge. The average capacitance values at 25° C. and at 125° C. and the average capacitance ratios were as follows:

| Ex. | Level of Vanadium Addition (ppm) | Actual Vanadium Content (ppm) | Capacitance at 25°C. ($\mu$far./in.$^2$) | Capacitance at 125°C. ($\mu$far./in.$^2$) | Capacitance Ratio |
|---|---|---|---|---|---|
| 1 | — | — | 10.6 | 23.8 | 2.25 |
| 2 | 50 | 38 | 10.3 | 13.7 | 1.33 |
| 3 | 125 | 73 | 10.1 | 10.9 | 1.08 |
| 4 | 250 | 160 | 10.3 | 11.0 | 1.07 |
| 5 | 500 | 350 | 10.0 | 10.6 | 1.06 |

Example 6

A tantalum button melted from foils containing various levels of vanadium was processed to foil containing a final vanadium content of 110 parts per million.

The foil was etched and tested as described in Examples 1 to 5 to produce average capacitance values of 10.5 and 14.2 (microfarads/in.$^2$) at 25°C. and 125° C., respectively and an average capacitance ratio of 1.35.

Example 7

A tantalum powder base material made from a blend of two batches produced from ore in a manner similar to the base material of Examples 1 to 5 was blended with a vanadium-containing master alloy prepared from bulk tantalum in the manner described in Examples 1 to 5 to produce a foil product having a vanadium content of 120 parts per million.

The foil was made, etched and tested as described in Examples 1 to 5 to produce average capacitance values of 10.0 and 10.8(microfarads/in.$^2$) at 25°C. and 125°C. respectively, and an average capacitance ratio of 1.08.

Example 8

A tantalum powder base material was prepared from $K_2TaF_7$ by electrolytic reduction. A master alloy powder was prepared from bulk tantalum by the method described in Examples 1 to 5. The base material and master alloy were then blended to provide a tantalum powder which, when fabricated to a foil, contained 98 parts per million of vanadium. The foil was prepared, etched and tested as described in Examples 1 to 5 and had average capacitance values of 11.3 and 12.3(microfarads/in.$^2$), at 25°C. and 125° C., respectively, and a capacitance ratio of 1.08.

Example 9

A tantalum powder base material was prepared as in Example 8, except that sodium reduction was used instead of electrolytic reduction. The base material was blended with the master alloy of Example 8 to provide a tantalum powder which, when fabricated to a foil, contained 105 parts per million of vanadium. The foil was prepared, etched and tested as described in Examples 1 to 5 and had average capacitance values of 11.8 and 12.9(microfarads/in.$^2$)at 25°C. and 125° C., respectively, and a capacitance ratio of 1.09.

Example 10

The tantalum powder base material of Example 9 was blended with a sufficient amount of $V_2O_5$ to provide a vanadium content of 100 parts per million in the foil prepared, etched and tested as described in Examples 1 to 5. The etched foil had average capacitance values of 12.6 and 13.7(microfarads/in.$^2$)at 25°C. and 125° C., respectively, and an average capacitance ratio of 1.09.

Example 11

A tantalum powder base material prepared from a $K_2TaF_7$ extract by the steps recited in Example 8 was blended with the master alloy of Example 8 to provide a tantalum powder which, when fabricated to a foil, contained 55 parts per million of vanadium. The foil was made, etched and tested as described in Examples 1 to 5 and had average capacitance values of 11.7 and 13.1(microfarads/in.$^2$)at 25°C. and 125° C., respectively, and an average capacitance ratio of 1.12.

The preferred range of proportions of vanadium in the tantalum foil is from about 60 to about 150 parts per million. Although the presence of vanadium in the tantalum foil at lower levels, for example at about 30 parts per million, produces a useful result in the substantial reduction of the capacitance ratio as compared with tantalum foil without vanadium, reduction of the capacitance ratios to about 1.1, or less, requires vanadium levels of at least about 60 parts per million. Increasing the vanadium content of the foil to levels above about 150 parts per million achieves little additional improvement in capacitance ratios. About 500 parts per million of vanadium represents a practical upper limit of vanadium content, but even higher levels may be used without adverse effect, although no additional benefits are obtained thereby.

It will be understood by those skilled in the art that variations and modifications of this invention may be employed without departing from the scope of the invention.

We claim:

1. An etched, self-supporting tantalum foil consisting essentially of tantalum and containing at least about 30 parts up to about 500 parts per million of vanadium.

2. A foil as recited in claim 1 in which said foil contains no more than about 800 parts per million of impurities, including said vanadium.

3. An etched, self-supporting tantalum foil having no more than about 800 parts per million of impurities, including from about 60 to about 150 parts per million of vanadium.

* * * * *